(12) United States Patent  
Macri et al.

(10) Patent No.: US 8,856,458 B2  
(45) Date of Patent: Oct. 7, 2014

(54) POLYMORPHOUS SIGNAL INTERFACE BETWEEN PROCESSING UNITS

(75) Inventors: Joseph D. Macri, San Francisco, CA (US); Daniel L. Bouvier, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 615 days.

(21) Appl. No.: 12/638,127

(22) Filed: Dec. 15, 2009

(65) Prior Publication Data

US 2011/0145492 A1    Jun. 16, 2011

(51) Int. Cl.  
*G06F 12/06* (2006.01)  
*G06F 1/32* (2006.01)

(52) U.S. Cl.  
CPC .............. *G06F 1/3293* (2013.01); *Y02B 60/32* (2013.01)  
USPC .................... 711/147; 711/105; 711/E12.078

(58) Field of Classification Search  
CPC ................... H04L 29/06027; H04L 29/06047; H04L 65/4007; H04L 65/80; H04L 67/04; H04L 67/303; H04L 12/5692; H04L 2012/5607; H04W 4/00; H04W 74/00; H04W 76/02; H04W 88/06; H04W 92/24; H04W 36/12; H04W 52/0274; H04W 52/028; H04W 76/043; H04W 84/18; G06F 1/3203; G06F 11/1641; G06F 1/3275; G06F 2201/845; G06F 9/4425; G06F 9/45504; G06F 1/324; G06F 9/30189; G06F 9/3885; G06F 11/1658; G06F 11/1679; G06F 12/0253; G06F 12/0804; G06F 12/089  
USPC .................................. 711/105, 147, E12.078  
See application file for complete search history.

(56) References Cited

U.S. PATENT DOCUMENTS

2010/0083019 A1* 4/2010 Aoki ............................. 713/320  
2010/0185833 A1* 7/2010 Saito et al. .................... 712/203

* cited by examiner

*Primary Examiner* — Yong Choe  
(74) *Attorney, Agent, or Firm* — Volpe and Koenig, P.C.

(57) ABSTRACT

A single interconnect is provided between a first processor and a second processor, such that the first processor may access a common memory through the second processor while the second processor can be mostly powered off. The first processor accesses the memory through a memory controller using a standard dynamic random access memory (DRAM) bus protocol. Instead of the memory controller directly connecting to the memory, the access path is through the second processor to the memory. Additionally, a bidirectional communication protocol bus is mapped to the existing DRAM bus signals. When both the first processor and the second processor are active, the bus protocol between the processors switches from the DRAM protocol to the bidirectional communication protocol. This enables the necessary chip-to-chip transaction semantics without requiring the additional cost burden of a dedicated interface for the bidirectional communication protocol.

10 Claims, 6 Drawing Sheets

POLYMORPHOUS SIGNAL INTERFACE BETWEEN PROCESSING UNITS

FIELD OF INVENTION

The present invention relates to multiple processors and, more particularly, to a method and apparatus for connecting multiple processors to a common memory.

BACKGROUND

Current computing systems may provide multiple processors partitioned across different chips to reach an economical distribution of transistors and to potentially take advantage of different semiconductor process technology types. Where different process technology types are applied, a high performance process type allows a processor to toggle at a high clock rate at the expense of a high power requirement, while a low power process type offers a lower performance level, usually with substantial power savings over the high performance process type. To permit all processors to work on a common workload under a standard operating system, all processors need to be able to access a common pool of memory.

Memory cannot be easily connected to two different places at the same time. One previously implemented method of handling this problem was to supply a discrete memory controller with the processors located outside of the memory controller and connected to the memory controller as peer-level devices.

With higher performance systems, it is desirable to have the processors and the memory controller integrated in the same chip and the memory directly attached. This construction lowers the access latency to memory for the high performance processor, providing a performance improvement. It also lowers the cost by reducing the number of components in the system. But this construction creates difficulties for a subsequent processor chip, such as the low power processor, to access memory since this processor is not directly connected to the memory. Existing solutions utilize a memory mapped interconnect, for example, Peripheral Component Interconnect (PCI) or HyperTransport.

But for power managed applications, these solutions create another problem: the memory controller and the bus logic within the high performance processor must remain powered on to allow memory access by the low power processor even when the high performance processor is inactive. This leads to a waste of power. It would be desirable to power off as much of the high performance processor as possible, to maximize power savings when only the low power processor is active.

In addition, if the low power processor were to be used as a standalone processor, it would need its own memory controller, thus requiring additional signal pins on the chip for the memory interface. To reduce the cost of the low power processor, it is desirable to keep the pin count and package size to a minimum.

It is desirable to provide a single interconnect between the low power processor and the high performance processor, such that the low power processor can access memory through the high performance processor while the high performance processor can be mostly powered off.

In a scenario where both the low power processor and the high performance processor are active at the same time, are accessing a shared memory, and each have caches, then these accesses need to be cache coherent. Any transactions that the low power processor issues need to go through the high performance chip and snoop its cache. (Snooping is a mechanism to implement cache coherence.) The high performance processor also needs a path to snoop the caches in the low power chip. One solution to this problem is to use the coherent HyperTransport (HT) protocol or another bidirectional communication protocol. But using this protocol requires a separate signal pin interface between chips, in addition to the signal pins required for the dynamic random access memory (DRAM) bus.

The present application proposes a solution to morph the unidirectional DRAM bus into a bidirectional communication bus.

SUMMARY

A computer system includes a first processor, a second processor, and a common memory connected to the second processor. A method for switching the computer system from a low power mode, in which the first processor is active, to a high performance mode, in which both the first processor and the second processor are active, begins by powering on the second processor. Traffic from the first processor to the common memory is quiesced. The path used by the first processor to access the common memory is switched from a first path across the second processor to a second path across the second processor.

A computer system includes a first processor, a second processor, and a common memory connected to the second processor. A method for switching the computer system from a high performance mode, in which the first processor and the second processor are active, to a low power mode, in which only the first processor is active, begins by quiescing all central processing unit cores on the second processor. Traffic from the second processor to the common memory is quiesced. The path used by the first processor to access the common memory is switched from a first path across the second processor to a second path across the second processor.

A computer system includes a common memory, a first processor connected to the common memory, and a second processor in communication with the first processor. The first processor includes one or more central processing unit (CPU) cores, a memory controller hub in communication with each of the CPU cores, one or more memory controllers in communication with the memory controller hub and the common memory, a bidirectional communication protocol controller in communication with the memory controller hub, and a memory bus connected to the common memory. The second processor includes one or more CPU cores, a memory controller hub in communication with each of the CPU cores, one or more memory controllers in communication with the memory controller hub and the common memory, a bidirectional communication protocol controller in communication with the memory controller hub, a memory bus connected to the common memory. The computer system also includes a polymorphous link between the first processor and the second processor, whereby the first processor can access the common memory through the polymorphous link.

BRIEF DESCRIPTION OF THE DRAWINGS

A more detailed understanding of the invention may be had from the following description, given by way of example, and to be understood in conjunction with the accompanying drawings, wherein.

DETAILED DESCRIPTION OF THE PREFERRED EMBODIMENTS

A single interconnect is provided between a low power processor (LPP) and a high performance processor (HPP), such that the LPP can access a common memory through the HPP while the HPP can be mostly powered off. When the LPP wants to access the memory, it does so through a memory controller using a standard dynamic random access memory (DRAM) bus protocol. Instead of the memory controller directly connecting to the memory, the access path is through the HPP to the memory. In effect, the HPP functions like a DRAM bus repeater or redriver for the LPP. In addition, a bidirectional communication protocol bus is mapped to the existing DRAM bus signals. When both the LPP and the HPP are active, the bus protocol between the processors switches from the DRAM protocol to the bidirectional communication protocol. This enables the necessary chip-to-chip transaction semantics without requiring the additional cost burden of a dedicated interface for the bidirectional communication protocol.

In one exemplary implementation described below, coherent HyperTransport is used as the bidirectional communication protocol. One of skill in the art can implement any other bidirectional communication protocol without altering the operation of the present invention. For example, the Peripheral Component Interconnect (PCI) protocol or the RapidIO protocol may be used as the bidirectional communication protocol.

Figure 1:
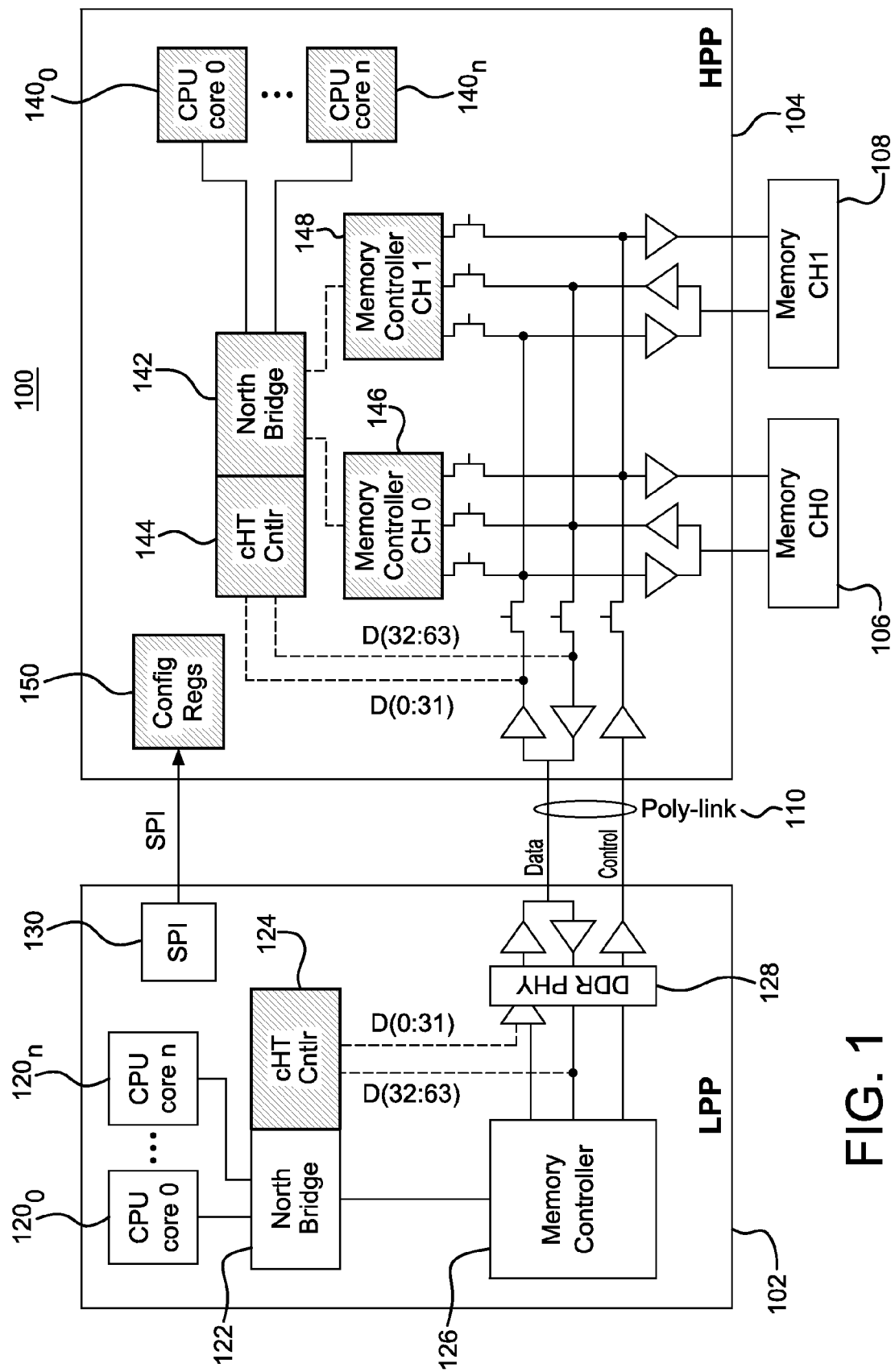
FIG. 1 is a diagram of a system operating in a low power mode.

FIG. 1 is a diagram of a system 100 operating in a low power mode. The system 100 includes a low power processor (LPP) 102, a high performance processor (HPP) 104, a first memory bank (Ch 0) 106, and a second memory bank (Ch 1) 108. It is noted that the designations LPP and HPP are arbitrary; the LPP and HPP may be any two processing units that communicate with each other. While two processing units are shown in FIG. 1, it is noted that any number of processing units may be configured to communicate with each other as described herein. The difference between the LPP 102 and the HPP 104 herein is that the memory 106, 108 is directly connected to the HPP 104. In addition, only two memory banks are shown in FIG. 1 for illustration purposes; one skilled in the art could implement any number of memory banks. The LPP 102 and the HPP 104 are connected by a polymorphous link (poly-link) 110.

The LPP 102 includes one or more CPU cores $120_0$-$120_n$, a northbridge (a memory controller hub) 122, a coherent HyperTransport (cHT) controller 124, a memory controller 126, a double data rate (DDR) DRAM physical (PHY) bus 128, and a serial peripheral interface (SPI) 130. The HPP 104 includes one or more CPU cores $140_0$-$140_n$, a northbridge 142, a cHT controller 144 (the inactive paths from the cHT controller 144 are shown as dashed lines), a first memory controller 146 for the first memory bank 106, a second memory controller 148 for the second memory bank 108, and configuration registers 150.

When the system 100 is operating in the low power mode, the LPP 102 and at least one of its CPU cores $120_0$-$120_n$ are active, while most of the HPP 104 is inactive (inactive components are shown with shading in FIG. 1). When the LPP 102 needs to access memory 106, 108, the accesses are made through the northbridge 122 via the memory controller 126, through the DDR PHY bus 128, over the polymorphous link 110, and to the memory 106, 108 using a standard DDR DRAM bus protocol. The polymorphous link 110 transports data to and from the memory 106, 108, and control signals to the memory 106, 108.

The SPI 130 reads the contents of the configuration registers 150 prior to the HPP 104 being powered down. The SPI 130 stores a copy of the configuration registers such that when the HPP 104 is powered on, the configuration information may be pushed back into the configuration registers 150, thereby accelerating the configuration process. It is noted that one skilled in the art can implement other ways of retaining the configuration information of the HPP 104. One example is to store the configuration information in non-volatile memory on the HPP 104 (not shown in FIG. 1).

In the low power mode, the polymorphous link 110 operates as a standard DRAM bus. The LPP 102 masters all of the read and write transactions to the memory 106, 108 using the DDR DRAM bus protocol. Only the bus running through the HPP 104 needs to be powered; there is no need for a protocol translation function in the HPP. Therefore, the remaining components of the HPP 104 can be powered off and the LPP 102 can still access the memory 106, 108.

Figure 2:
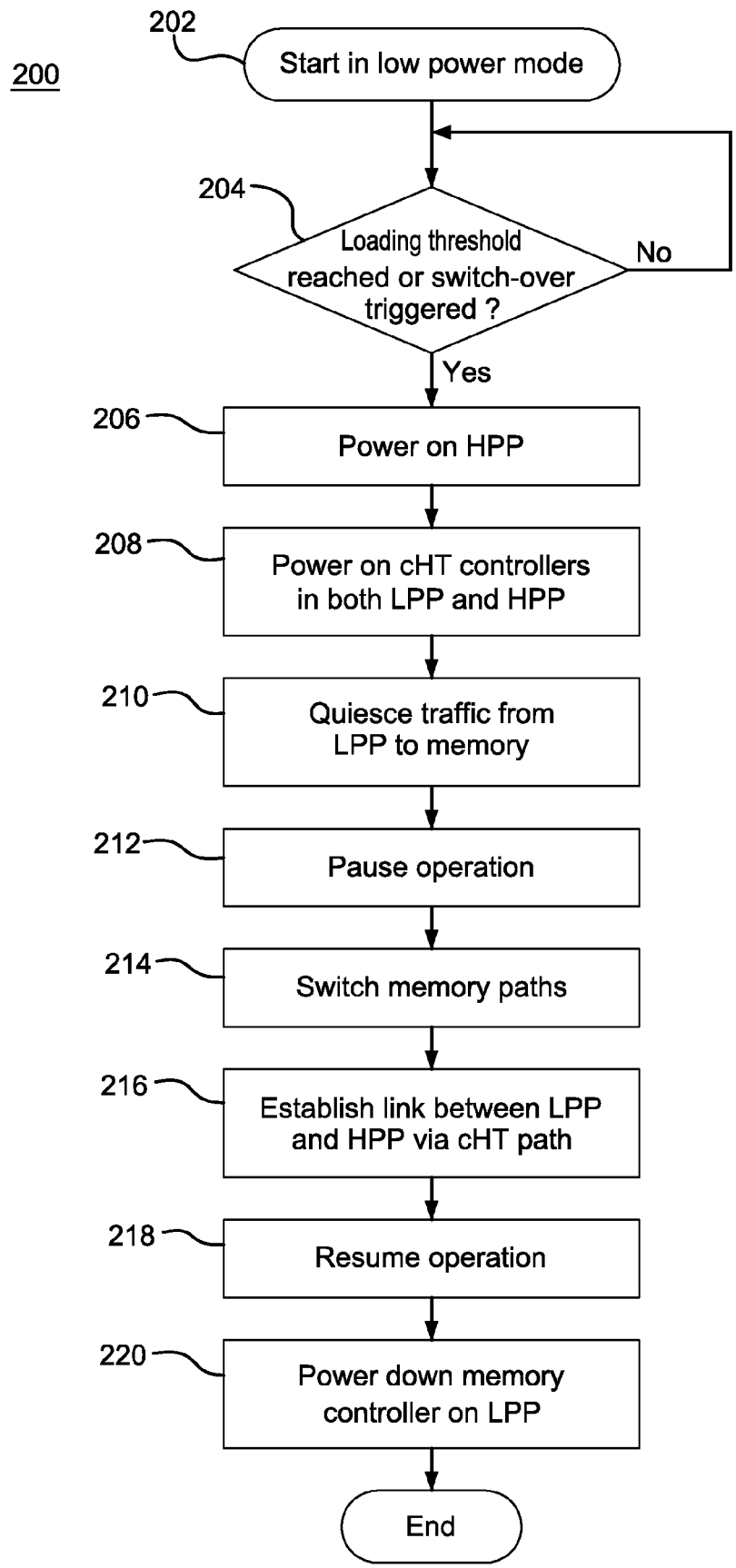
FIG. 2 is a flowchart of a method for switching the system from the low power mode to a high performance mode.

FIG. 2 is a flowchart of a method 200 for switching the system from the low power mode to a high performance mode. The method 200 begins with the system operating in the low power mode (step 202). A determination is made whether a software loading threshold has been reached or a switch-over has been triggered (step 204). The loading threshold is set in advance, based on the overall configuration of the system and the system designer's preferences. Additionally, a trigger may occur due to a call for certain functions that do not exist on the LPP. This might include, but is not limited to, instructions that are not implemented on the LPP.

The determination may be made when a new application is launched on the system; based on the application's usage requirements, the loading threshold may be exceeded once the new application is loaded and running. But this determination is not limited to when a new application is launched. Modern operating systems (OSs) have mechanisms to determine how busy they are during runtime of multiple threads. OSs provide mechanisms such as thread migration to move processes from one processor to another to help balance the load. If the loading threshold has not been reached or a switch-over has not been triggered, then the system stays in the low power mode.

If the loading threshold has been reached or the switch-over has been triggered (step 204), then the OS calls for the HPP to be powered on (step 206). It is noted that a system interrupt (e.g., an inter-processor interrupt) may also be used to power on one of the HPP CPU cores. For example, an interrupt may be generated by an event from a peripheral that has been assigned explicitly to one of the HPP's CPU cores. The interrupt controller hardware, upon detecting that the pending interrupt is targeted toward a powered down CPU core, is responsible for powering on the HPP and the target CPU core so that an interrupt service routine (ISR) may be executed.

The cHT controllers in both the LPP and the HPP are powered on, i.e., a configuration sequence is performed in the cHT controllers (step 208). The LPP quiesces all traffic to memory, including completing all pending memory transactions (step 210). For example, any pending reads from memory are completed (i.e., the read request is kept open until the read data is returned to the memory controller) and any pending write requests are held.

LPP operation is paused (step 212) and the LPP switches memory paths from the memory controller to the cHT controller (step 214). In one implementation, the switch is controlled by a side-band signal from the LPP to the HPP. It is noted that one skilled in the art can implement other ways to initiate the switch. A link between the LPP and the HPP via the cHT path is established (step 216) and the LPP resumes operation via the cHT controller memory path (step 218). After switching to the cHT memory path, the system operates in the high performance mode and the memory controller on the LPP is powered down (step 220).

Figure 3:
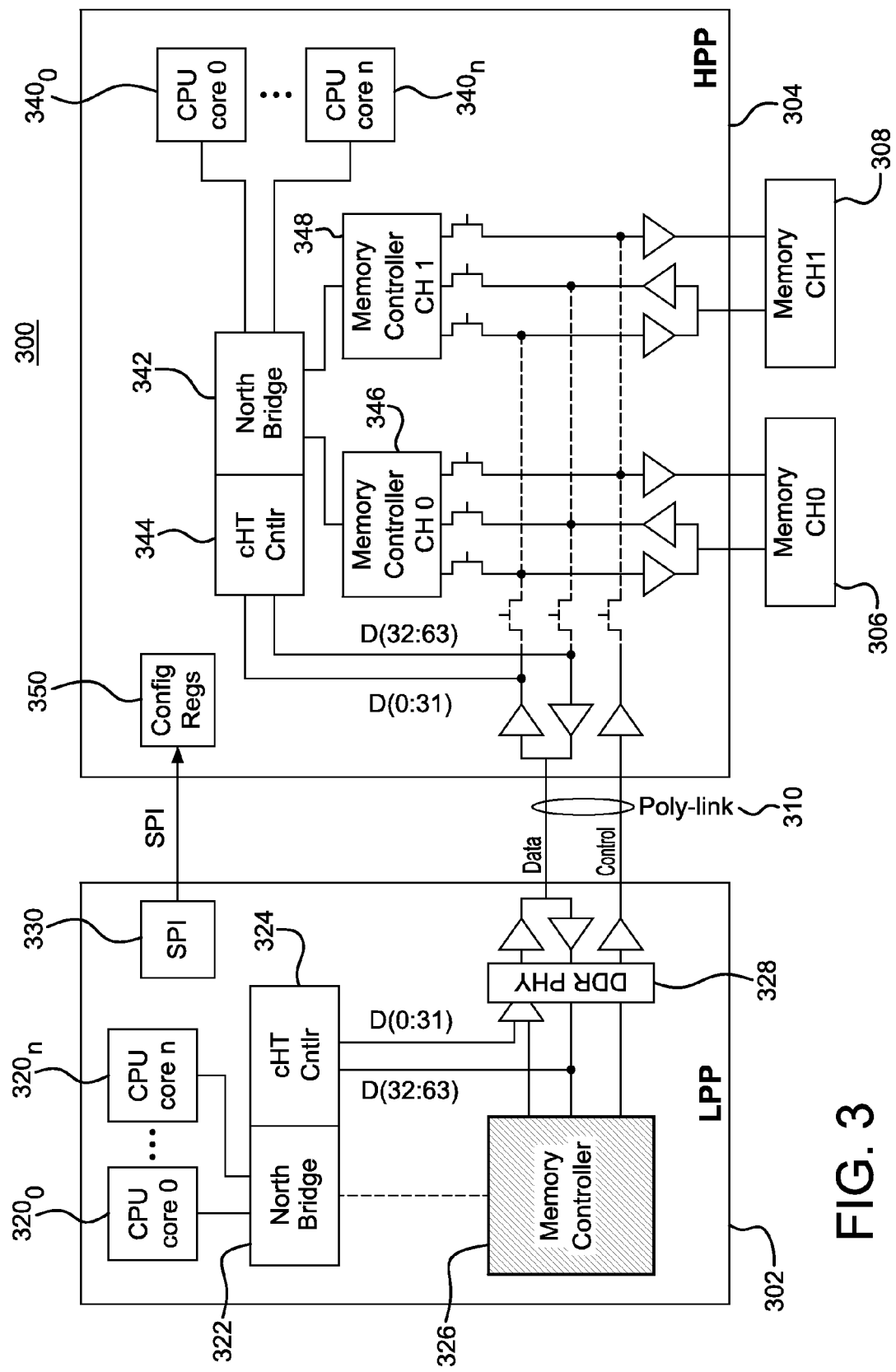
FIG. 3 is a diagram of the system operating in the high performance mode.

FIG. 3 is a diagram of a system 300 operating in the high performance mode. The system 300 includes an LPP 302, an HPP 304, a first memory bank (Ch 0) 306, and a second memory bank (Ch 1) 308. The LPP 302 and the HPP 304 are connected by a polymorphous link (poly-link) 310.

The LPP 302 includes one or more CPU cores $320_0$-$320_n$, a northbridge 322, a cHT controller 324, a memory controller 326, a DDR DRAM PHY bus 328, and a SPI 330. The HPP 304 includes one or more CPU cores $340_0$-$340_n$, a northbridge 342, a cHT controller 344, a first memory controller 346 for the first memory bank 306, a second memory controller 348 for the second memory bank 308, and configuration registers 350.

When the system 300 is operating in the high performance mode, the memory controller 326 of the LPP 302 is inactive (shown shaded in FIG. 3), while the remaining components of the LPP 302 and at least one of the CPU cores $340_0$-$340_n$, the northbridge 342, the cHT controller 344, the first memory controller 346, the second memory controller 348, and the configuration registers 350 of the HPP 304 are active. The LPP 302 accesses the memory 306, 308 by using the northbridge 322 to pass transactions to the cHT controller 324 and communicate over the DDR PHY bus 328 and the polymorphous link 310. The HPP 304 accesses the memory 306, 308 by using the cHT controller 344, the northbridge 342, the first memory controller 346, and the second memory controller 348. When the HPP 304 is first powered on, the SPI 330 pushes the configuration information into the configuration registers 350. As noted in connection with FIG. 1, the configuration information for the HPP 304 may be restored by other methods including, but not limited to, non-volatile memory on the HPP 304.

In the high performance mode, the path to the memory 306, 308 from the LPP 302 is switched from the standard DRAM path to a cHT path (the now inactive DRAM path through the HPP 304 is shown as dashed lines). The cHT controller 324 is powered on and the memory controller 326 is turned off. The cHT controller 324 is multiplexed into the same pins used by the memory controller 326 to access the polymorphous link 310. Using the polymorphous link 310 permits hardware coherency and essentially creates a heterogeneous symmetrical multi-processor by integrating a number of different processors into the system 300.

In the high performance mode, because both the LPP 302 and the HPP 304 are powered on, a bidirectional communication protocol is required to provide both the LPP 302 and the HPP 304 with the ability to issue read and write transactions to each other. Because the DDR memory bus is a unidirectional communication protocol, an alternate protocol (like cHT in this example) is used. One reason for using cHT in this example is that the cHT protocol provides cache coherent transaction semantics. But cache coherency may not be a requirement in the system architecture, and other bidirectional communication protocols may be used. The bidirectional communication protocol permits the HPP 304 to access memory mapped devices, such as IO peripherals, in the LPP 302.

It is noted that the HPP 304 may include any number of CPU cores; the switch over from low power mode to high performance mode is triggered when any CPU core on the HPP becomes active.

When the system 300 is running in the low power mode, the OS is running on the LPP 302. Modern OSs run on a primary processor having a scheduler. In a multi-core or multi-processor system, the scheduler decides when a loading threshold has been reached, based on monitored performance metrics. When the loading threshold has been reached, the scheduler begins scheduling processes or threads out to other processor cores. The OS recognizes when it reaches the loading threshold based on the performance metrics and decides to switch from the low power mode to the high performance mode. The threshold may be reached, for example, upon launching a particular application which requires a higher performance level, such as a video editing application. An OS may also perform thread migration, whereby active threads are moved from one processor core to another processor core depending on the computational demand and associated processor loading.

During the switch over, the OS works with a power management driver to power on the HPP 304. The LPP 302 would then have the capability of turning on the power to the HPP 304 and beginning the sequence to quiesce traffic through the polymorphous link 310 to the memory 306, 308.

The amount of time required for the system to switch from the low power mode to the high performance mode is, in one embodiment, on the order of 100-200 microseconds. Most of the time is taken up by the HPP 304 powering up and performing a self-reset function. During the HPP initialization time, the LPP may continue to access memory through the DRAM interface. When the HPP is ready to go online, additional time (in one embodiment, on the order of 100-200 nanoseconds) may be needed to quiesce all traffic to the memory 306, 308 before the transaction path can be switched.

Because the DDR PHY 328 is already up and running between the LPP 302 and the HPP 304, byte alignment and synchronization between the LPP 302 and the HPP 304 is already established, which saves some time during the switch over. Memory interfaces are source synchronous interfaces, which require training once they are turned on to establish byte alignment and clock synchronization. In this case, the data is already synchronized from previous use of the DDR PHY 328 and bytes are moving across the physical lane. The switch over is a protocol swap that runs on top of the DDR PHY, which is a fast transition. Generally speaking, the switch over is fast enough that a user of a computer employing this system would not notice that the switch over has occurred.

By repurposing the DDR DRAM link for both the DDR DRAM path and the cHT path, the number of signal interfaces on the chips can be reduced, thereby enabling cost savings and space savings on the chip as well as reduced printed circuit board routing between the devices.

Figure 4:
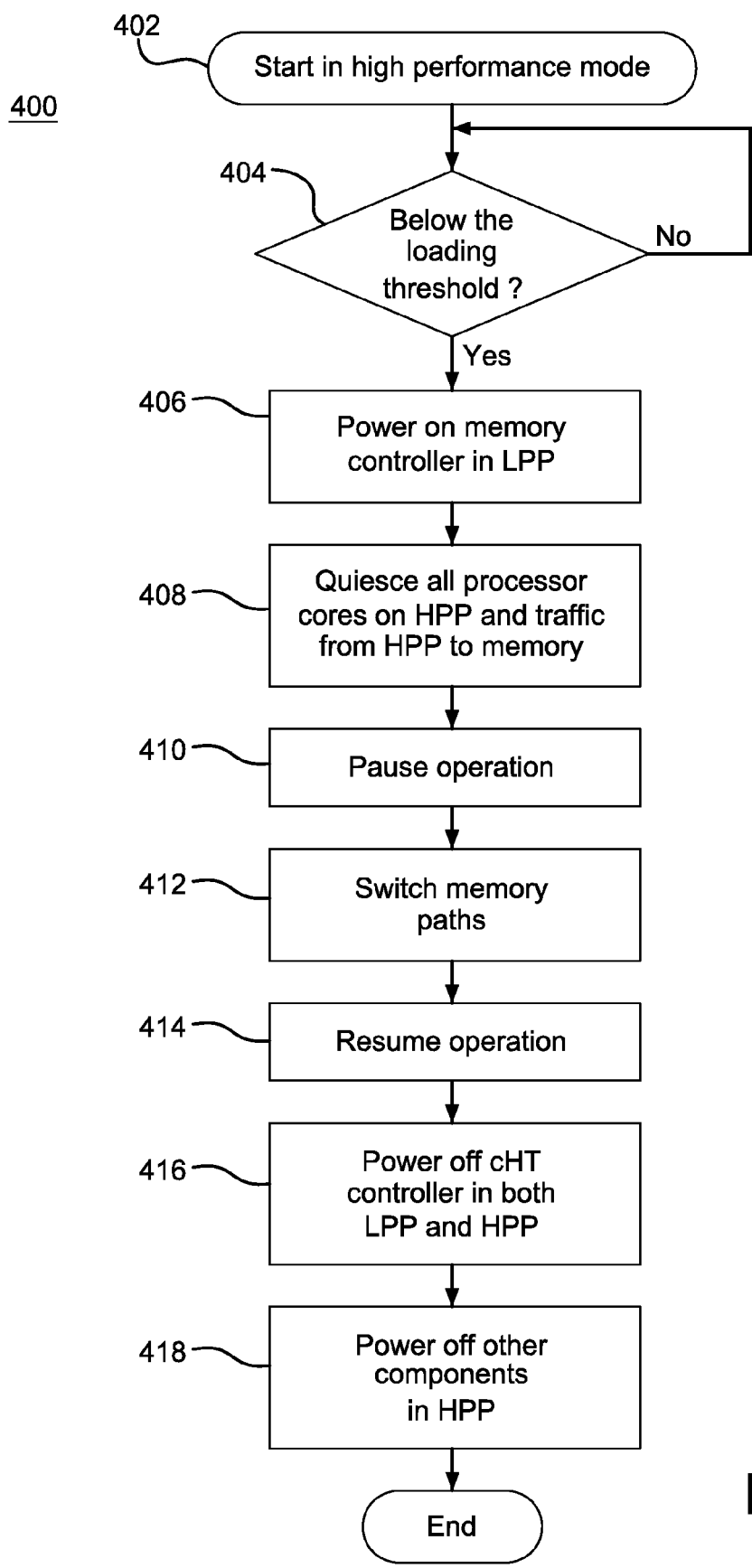
FIG. 4 is a flowchart of a method for switching the system from the high performance mode to the low power mode.

FIG. 4 is a flowchart of a method 400 for switching the system from the high performance mode to the low power mode. The method 400 begins with the system operating in the high performance mode (step 402). A determination is made whether the system load has dropped below the loading threshold (step 404). If the system is still operating above the loading threshold, then system stays in the high performance mode.

If the system load falls below the loading threshold (step 404), then the memory controller in the LPP is powered on (step 406). The HPP quiesces all processor cores on the HPP and all traffic to memory, including completing all pending memory transactions (step 408). For example, execution on the processor cores is suspended, caches are flushed, any pending reads from memory are completed (i.e., the read request is kept open until the read data is returned to the memory controller) and any pending write requests are held. System operation is paused (step 410), the HPP and the LPP switch memory paths from the cHT controller to the memory controller on the LPP (step 412), and the system resumes operation via the memory controller memory path (step 414). After switching to the memory controller memory path in the LPP, the cHT controllers in both the LPP and the HPP are powered off (step 416). Other HPP components that are not needed can be powered off (step 418) and the system operates in the low power mode.

Figure 5:
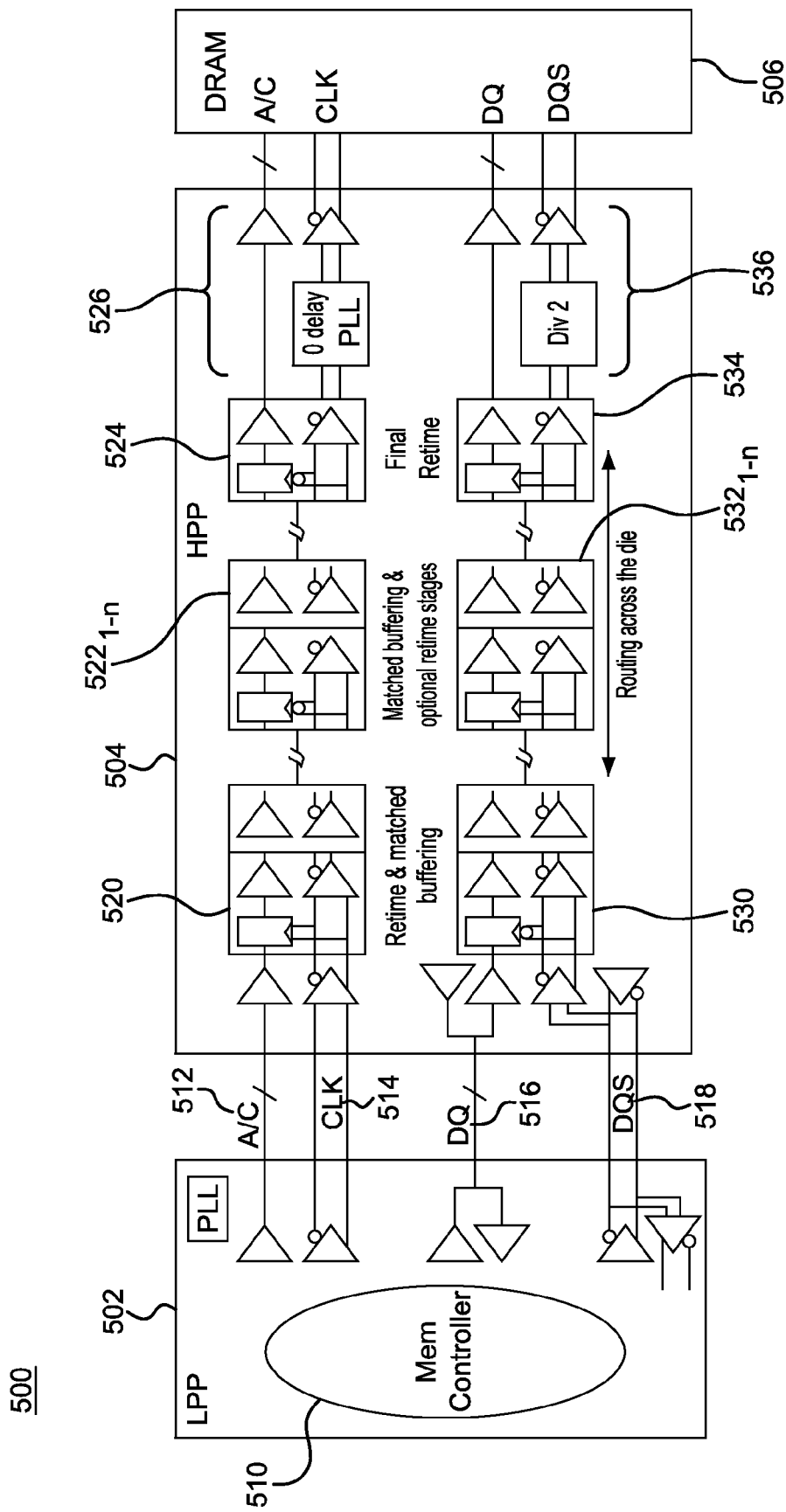
FIG. 5 is a diagram of the polymorphous link memory write path when the HPP is acting as a transceiver.

FIG. 5 is a diagram of a system 500 showing the polymorphous link memory write path when the HPP is acting as a transceiver. The system 500 includes an LPP 502, an HPP 504, and a memory 506. In the example embodiment described herein, the memory 506 uses the DDR3 memory protocol. One skilled in the art can create a similar write path for other memory protocols.

The LPP 502 includes a memory controller 510 which drives several signals, including address/control (A/C) signals 512, clock (CLK) signals 514, data (DQ) signals 516, and data strobe (DQS) signals 518. The DQ signals 516 may include any number of data bits, and is typically a multiple of 32. The DQS signals 518 act as source synchronous clocks for the DQ signals 516.

The A/C signals 512 and the CLK signals 514 are sent first. To synchronize the phase of the CLK signals and the A/C signals, a first retime and matched buffering stage 520, one or more intermediate retime and matched buffering stages $522_{1-n}$, a final retiming stage 524, and a PHY interface 526 are located on the write path across the HPP 504. The retime and matched buffering stages 520-524 are used because the signals cannot be sent completely across the HPP 504 in a single clock cycle, and it is necessary to keep the A/C signals 512 and the CLK signals 514 in sync. The internal clock of the HPP 504 is used by the retime and matched buffering stages 520-524 for synchronization. The number of intermediate retime and matched buffering stages $522_{1-n}$ used directly depends upon the physical length of the path across the HPP 504; i.e., the longer the path, the more intermediate retime and matched buffering stages will be needed. The PHY interface 526 is used to redrive the CLK signals 514 (via a zero delay phase-locked loop (PLL)) to synchronize with the clock in the memory 506.

A similar path across the HPP 504 for the DQ signals 516 and the DQS signals 518 includes a first retime and matched buffering stage 530, one or more intermediate retime and matched buffering stages $532_{1-n}$, a final retiming stage 534, and a PHY interface 536. As with the path for the A/C signals 512 and the CLK signals 514, the internal clock of the HPP 504 is used by the retime and matched buffering stages 530-534 for synchronization. The DQS signals 518 are used to latch the DQ signals 516. The PHY interface 536 is used to redrive the DQS signals 518 (via a divider) to synchronize with the clock in the memory 506.

In effect, the write path acts like a fully latched transceiver with no intelligence, meaning that the transceiver does not know anything about the signals that are passing through. The foregoing description of the write path across the HPP 504 is exemplary, and one skilled in the art could design another write path type either with or without the use of the retime and matched buffering stages.

Figure 6:
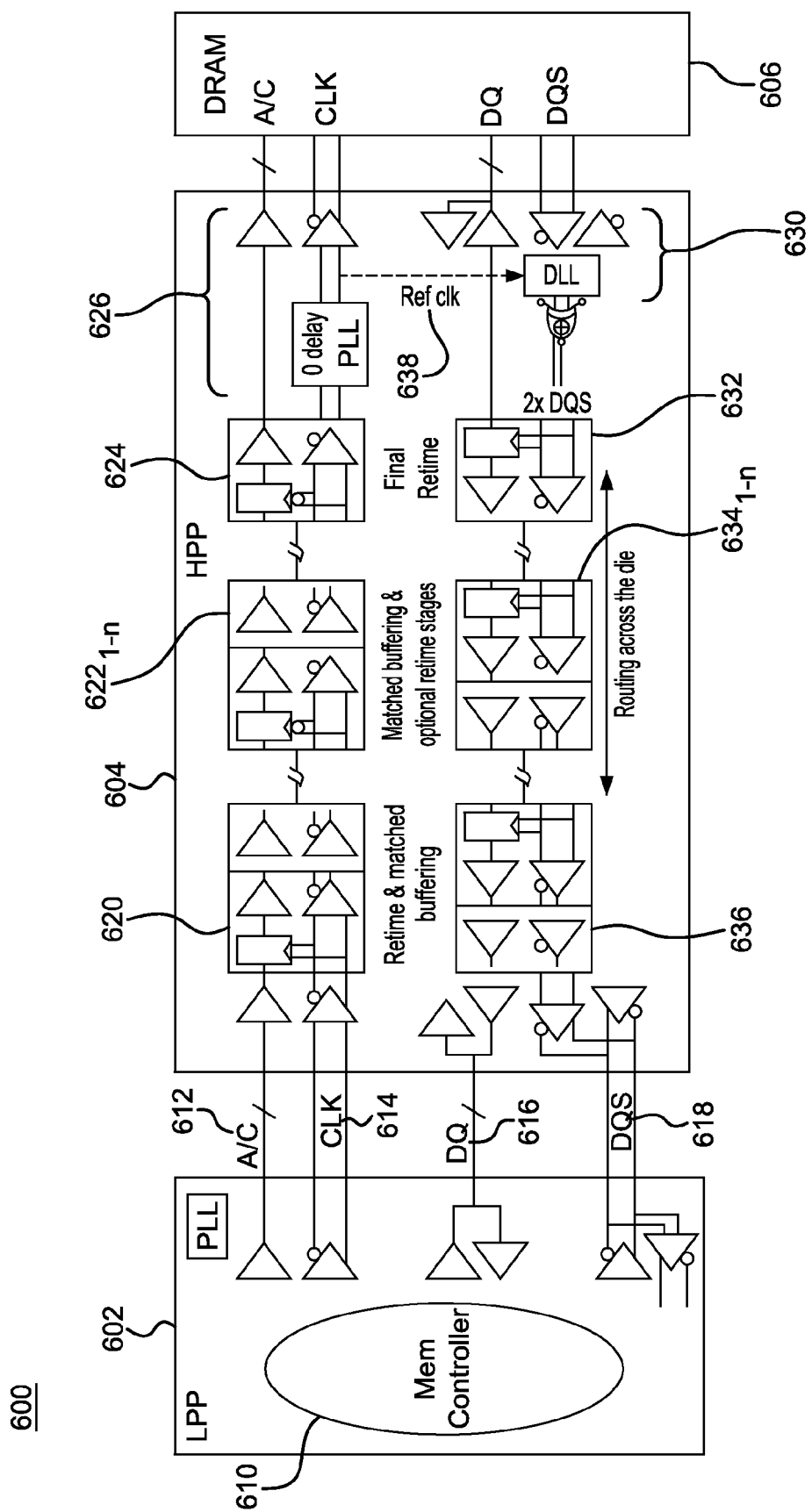
FIG. 6 is a diagram of the polymorphous link memory read path when the HPP is acting as a transceiver.

FIG. 6 is a diagram of a system 600 showing the polymorphous link memory read path when the HPP is acting as a transceiver. The system 600 includes an LPP 602, an HPP 604, and a memory 606. In the example embodiment described herein, the memory 606 uses the DDR3 memory protocol. One skilled in the art can create a similar read path for other memory protocols.

The LPP 602 includes a memory controller 610 which drives several signals, including A/C signals 612, CLK signals 614, DQ signals 616, and DQS signals 618. The A/C signals 612 and the CLK signals 614 are sent first, to synchronize the phase of the A/C signals and the CLK signals and to identify the data to be read. A first retime and matched buffering stage 620, one or more intermediate retime and matched buffering stages $622_{1-n}$, a final retiming stage 624, and a PHY interface 626 are located on the write path across the HPP 604. The retime and matched buffering stages 620-624 are used because the signals cannot be sent completely across the HPP 604 in a single clock cycle, and it is necessary to keep the A/C signals 612 and the CLK signals 614 in sync. The internal clock of the HPP 604 is used by the retime and matched buffering stages 620-624 for synchronization. The number of intermediate retime and matched buffering stages $622_{1-n}$ used directly depends upon the physical length of the path across the HPP 604. The PHY interface 626 is used to redrive the CLK signals 614 (via a zero delay PLL) to synchronize with the clock in the memory 606.

A similar path from the memory 606 to the memory controller 610 across the HPP 604 for the DQ signals 616 and the DQS signals 618 includes a PHY interface 630, a first retime and matched buffering stage 632, one or more intermediate retime and matched buffering stages $634_{1-n}$, and a final retiming stage 636. As with the path for the A/C signals 612 and the CLK signals 614, the internal clock of the HPP 604 is used by the retime and matched buffering stages 632-636 for synchronization. The DQS signals 618 are used to latch the DQ signals 616. A reference CLK signal 638 is derived from the CLK signals 614 and is used by the PHY interface 630 to phase align the DQS signals 618 from the memory 606. The PHY interface 630 redrives the DQS signals 618 (via a delay-locked loop (DLL)) over the path across the HPP 604. The PHY interface 630 functions like a shallow first-in first-out queue, to phase align the DQS signals 618 and latch the DQ signals 616 when the data is valid.

The foregoing description of the read path across the HPP 604 is exemplary, and one skilled in the art could design another read path type either with or without the use of the retime and matched buffering stages.

The present invention may be implemented in a computer program tangibly embodied in a computer-readable storage medium containing a set of instructions for execution by a processor or a general purpose computer. Method steps may be performed by a processor executing a program of instructions by operating on input data and generating output data. Suitable processors include, by way of example, both general and special purpose processors. Typically, a processor receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for switching a computer system, including a first processor, a second processor, and a common memory connected to the second processor, from a low power mode, in which at least a portion of the first processor is active and components on the second processor are inactive, to a high performance mode, in which at least a portion of the first processor and at least a portion of the components on the second processor are active, the method comprising:
    powering on at least a portion of the components on the second processor that are inactive in the low power mode;
    quiescing traffic from the first processor to the common memory; and
    switching paths used by the first processor to access the common memory from a first path across the second processor to a second path across the second processor.

2. The method according to claim 1, wherein the first path and the second path use a single interconnect between the first processor and the second processor.

3. The method according to claim 1, wherein the powering on includes powering on a bidirectional communication protocol controller in the first processor and a bidirectional communication protocol controller in the second processor.

4. The method according to claim 3, wherein:
    the first path used by the first processor to access the common memory is through a memory controller on the first processor; and
    the second path used by the first processor to access the common memory is through the bidirectional communication protocol controller on the first processor and the bidirectional communication protocol controller on the second processor.

5. The method according to claim 4, further comprising:
    powering down the memory controller on the first processor.

6. The method according to claim 3, further comprising:
    establishing a link between the first processor and the second processor via a path between the bidirectional communication protocol controllers.

7. The method according to claim 1, further comprising:
    pausing computer system operation after traffic from the first processor to the common memory has been quiesced and prior to switching the paths.

8. The method according to claim 1, further comprising:
    resuming computer system operation after the switching has been completed.

9. The method according to claim 1, further comprising:
    determining whether a switch has been triggered, wherein the paths are switched if the switch has been triggered.

10. The method according to claim 9, wherein the switch includes any one of: reaching a loading threshold on the first processor, calling a function that does not exist on the first processor, calling an instruction that is not implemented on the first processor, or a peripheral interrupt that is targeted to a specific central processing unit core on the second processor.

* * * * *